United States Patent [19]

Meiners et al.

[11] Patent Number: 5,504,179
[45] Date of Patent: Apr. 2, 1996

[54] PROCESS FOR THE MANUFACTURE OF FLEXIBLE MOLDED PARTS

[75] Inventors: Hans-Joachim Meiners, Leverkusen; Peter Haas, Haan; Eduard Mayer, Dormagen; Karl-Heinz Dörner, Pulheim, all of Germany

[73] Assignee: Bayer Aktiengesellschaft, Leverkusen, Germany

[21] Appl. No.: 521,204

[22] Filed: Aug. 30, 1995

[30] Foreign Application Priority Data

Sep. 8, 1994 [DE] Germany .......................... 44 31 963.0

[51] Int. Cl.⁶ .................................................. C08G 18/34
[52] U.S. Cl. .................. 528/49; 528/60; 528/64; 528/66; 528/67
[58] Field of Search .................. 528/49, 60, 64, 528/66, 67

[56] References Cited

U.S. PATENT DOCUMENTS

| | | | |
|---|---|---|---|
| 5,272,244 | 12/1993 | Harris et al. | 528/64 |
| 5,294,665 | 3/1994 | Pedain et wal. | 528/49 |
| 5,319,056 | 6/1994 | Wamprecht | 528/49 |
| 5,364,852 | 11/1994 | Hinz et al. | 528/64 |

*Primary Examiner*—Morton Foelak
*Attorney, Agent, or Firm*—Joseph C. Gil

[57] ABSTRACT

The present invention is directed to a RIM process wherein an isocyanate-terminated prepolymer is reacted with one or more isocyanate-reactive components which contian inorganic fillers. The improvement resides in including an acidc group containing compound with the isocyanate reactive components.

2 Claims, No Drawings

PROCESS FOR THE MANUFACTURE OF FLEXIBLE MOLDED PARTS

BACKGROUND OF THE INVENTION

The present invention is directed to a process for the manufacture of flexible molded parts from urethane and urea group containing elastomers through reaction in closed molds of i) an A-component containing isocyanate reactive materials and inorganic fillers with ii) a B-component that consists essentially of isocyanate-terminated semi prepolymers. The A-component contains both inorganic fillers and additives with acidic groups which enables easier working in of the components. The components are mixed and reacted using reaction injection molding technology.

The manufacture of polyurethane/urea elastomers through reaction of reactive mixtures produced by reaction injection molding from isocyanate-terminated semi-prepolymers and mixtures of aromatic diamines and higher molecular weight amino and hydroxyl group-containing compounds is, for example, known from U.S. Pat. No. 5,262,448 (corresponding to German Offenlegungschrift 3,914,718). The process permits the manufacture of elastomers with better mechanical characteristics in comparison to products which were manufactured based on the one shot process (such as is described in U.S. Pat. No. 4,218,543, which corresponds to German Auslegungschrift 2,622,951). A disadvantage of the molded parts manufactured based on the semi-prepolymer process is in the greater shrinkage (volume reduction after mold release). The use of molding tools which were provided for the one shot process led to molded parts with reduced volume when using these same tools for the semi-prepolymer process, such that the application of the semi-prepolymer process would require the construction of new molding tools which would better fit the circumstances.

Another problem is the frequently desired, additional use of inorganic filler and reinforcing materials of known type. Thus, for example, short fiber glass fillers could be suspended in the large volume B-component (NCO-semi prepolymer), but little use is made of this possibility due to the residual moisture contained in these fillers that reacts with NCO-groups. It is also known, for example, that certain film-forming agents or fiberglass containing adhesion promoters, and Wollastonite, cannot be worked in at all on the isocyanate side (B-component).

The A-component, consisting primarily of amine chain extending agents, shows on the other hand a bad cohesion capability for inorganic fillers so that the working of the A-component containing such fillers is almost impossible even under agitation.

DESCRIPTION OF THE INVENTION

Surprisingly, it was now discovered that the above disadvantages can be largely eliminated through the addition of acidic additives which are described in more detail in the following.

More particularly, the present invention is directed to a process for the manufacture of flexible molded parts from a polyurethane/urea elastomer through reaction in closed molds of reaction mixtures that are produced by the reaction injection molding process wherein the reaction mixture comprises:

A) an A-component comprising
 A1) one or more aromatic diamines which have at least one alkyl substituent each in a position ortho to the amino groups,
 A2) one or more aliphatic reactive components having an average hydroxyl or amine functionality of from 2 to 6 with an average molecular weight of 230 to 12,000, and consisting of at least one polyether or polyester containing hydroxyl and/or primary amino groups in a quantity of 5 to 20 equivalent-%, based on the total quantity of the groups reactive with isocyanate present in the components A1) and A2),
 A3) inorganic fillers in a quantity of 15 to 60 weight %, based on the total weight of the components A 1) to A3), and
 A4) other additives with
B) a B-component, consisting essentially of an isocyanate group-containing semi-prepolymer having an isocyanate group content of from 8 to 20 weight %, and being prepared by reacting:
 B1) a polyisocyanate component, consisting of a polyisocyanate or polyisocyanate mixture of the diphenyl methane series, and
 B2) a polyol component with an average molecular weight of 1,500 to 12,000, and an average hydroxyl functionality of at least 2.0,
 wherein the amounts of the components are such that the isocyanate index of the reaction mixture is from 90 to 120, and wherein component A4) comprises one or more acidic group-containing compounds having an acid number of from 20 to 400 in a quantity of 0.1 to 15.0 weight %, based on the weight of components A 1 ) and A2.

The A-component to be used in the process of the present invention comprises the individual components A1) to A4).

The component A2) is used in a quantity such that from 5 to 20, preferably 5 to 15 equivalent %, primary amine and/or hydroxyl groups in reference to all groups reactive toward isocyanate present in the components A1) and A2) are contributed by component A2). Primary amino groups are used in the calculation as monofunctional groups in the sense of the isocyanate-additions reactions.

The component A3) is used in a quantity of 15 to 60 weight %, in reference to the total weight of component A1) to A3).

The acidic group-containing compounds are used in quantities of 0.1 to 15.0, preferably 1.0 to 10 weight %, based on the total weight of components A 1) and A2).

Component A1) is a diamine having a molecular weight of from 122 to 400 with exclusively aromatically bonded primary amino groups which have at least one alkyl substituent in a position ortho to the amino groups, especially such which show at least one alkyl substitutent in the position ortho to the first amino group, and two alkyl substituents in a position ortho to the second amino group with each 1 to 4, preferably 1 to 3 carbon atoms, especially preferred are such which show at least an ethyl, n-propyl and/or isopropyl each in a position ortho to the amino groups, and methyl substituents in other position ortho to the amino groups. Examples for such diamines or preferred diamines are 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, and its technical mixtures with 1-methyl-3,5-diethyl-2,6-diaminobenzene or 3,5,3',5'-tetraisopropyl-4,4'-diaminodiphenyl methane. Any mixtures of such diamines can also be used as component A1). Especially preferred for component A1) are 1-methyl-3,5-diethyl-2,4-diaminobenzene or its mixtures with 1-methyl-3,5-diethyl-2,6-diaminobenzene (DETDA).

The component A2) consists of one or more polyethers or polyesters containing at least one aliphatically bonded primary amino group and/or aliphatically bonded hydroxyl group and having an average molecular weight of from 230 to 12,000, preferably 300 to 8,000 and especially preferred 400 to 7,000.

As used throughout this description, all information regarding the molecular weight of components reactive with isocyanate groups, refers to the molecular weight calculable from the functionality and the content of functional groups.

Suitable as component A2) or part of component A2) are, for example, polyether polyols of the molecular weight range 1,800 to 12,000, preferably 3,000 to 8,000, with 2 to 6, preferably 2 to 4, and especially 3, hydroxyl groups per molecule. Such polyether polyols are produced in known ways through alkoxylation of suitable starter molecules or mixtures of suitable starter molecules, whereby especially propylene oxide and ethylene oxide are used for alkoxylation. Suitable starter molecules are, for example, water, ethylene glycol, propylene glycol, trimethylol propane, pentaerythrite, sorbite or cane sugar or mixtures of such compounds. Especially preferred are such polyether polyols where at least 50% and preferably 70% of the hydroxyl groups are primary hydroxyl groups. Such polyether polyols develop through terminal grafting of ethylene oxide.

Suitable polyester polyols are, for example, the compounds mentioned in German Auslegungschrift 2,622,951, column 7, line 54 to column 8, line 37, as far as they correspond to the above mentioned description of the molecular weight and hydroxyl functionality.

Suitable aminopolyethers for component A2) or part of component A2), are such in the molecular weight range 230 to 5,000, especially 400 to 4,000 with 2 to 3, and preferably 2, primary amino groups per molecule. Suitable are, for example, amino polyethers produced through amination of the polyhydroxy polyethers in an appropriate molecular weight range, whose groups reactive with isocyanate groups consist of at least 80 equivalent-% of primary amino groups. Cited as examples are the polyoxypropylene diamine or polyoxypropylene triamine from Texaco, sold under the name Jeffamine D-230, D-400, D-2000, T-403 or T-5000.

Suitable as component A2) or part of component A2) are polyhydroxy polyesters, especially such of the molecular weight range 1,500 to 12,000, preferably 3,000 to 8,000 and especially 2,000 to 8,000 (average) with 2 to 2.5, preferably 2 to 2.2, primary hydroxyl groups per molecule. Known polyester polyols from polyurethane chemistry based on dicarboxylic acids (such as, for example, adipic acid, phthalic acid, tetrahydrophthalic acid, and hexahydrophthalic acid) and multi-valent alcohols (such as, for example, ethylene glycol, 1,4-butane diol, 1,6 hexane diol and proportionately glycerine or trimethyl propane) are particulalry useful.

Amino polyesters suitable as component A2) or part of component A2) are, for example, the aminopolyesters corresponding to the above mentioned polyester polyols. These amino polyesters can contain either aromatically or aliphatically bonded polymeric amine groups, and can be obtained from the polyester polyols mentioned, for example, through conversion of the polyester polyols with diisocyanates, and subsequent hydrolysis of the NCO-prepolymers.

Component A3) comprises inorganic fillers. The definition of 'fillers' should also include the known inorganic reinforcing materials. Fiberlike fillers are preferred as component A3), especially fiberglass in a ratio of length:diameter (I/d-ratio) of 5:1 to 20:1, at a length of 50 to 500 μm, Wollastonite-fibers with a I/d-ratio of 2:1 to 20:1, at a length of 10 to 100 μm. Mineral fibers, as they are offered by the Dutch company Lapinus Fibres BV, Roermond, Netherlands; additionally scale-type mineral fillers, as for example, mica with a ratio of thickness to diameter of 1:10 to 1:20 are also useful. Also, mineral hollow bodies of known type are suitable as component A3) or part of component A3).

Important to the invention is the use of acidic substances as component A4) or part of the component A4). These acidic compounds have acid numbers of from 20 to 400, preferably 40 to 250 mg KOH/g. Preferred are carboxylic acids corresponding to this description, as well as organic acids of phosphorus or sulfur corresponding to this description. Carboxylic acids of the cited acid range containing esters, amide, and/or urethane groups can also be used.

Specific useful acids include oleic acid, linoleic acid, linolenic acid, ricinoleic acid, polyricinoleic acid (esterification products of the ricinoleic acid with itself), citric ester or adipic ester of the mentioned acid range containing free carboxyl groups or reaction products of carboxylic acid anhydrides such as phthalic acid anhydride or maleic acid anhydride with multi-valent, and preferably ether and/or ester group-containing alcohols.

Suitable organic acids of phosporous are for example, $C_4$–$C_{18}$-alkane phosphoric acids, dialkylphosphates with 4 to 10 carbon atoms in the alkyl residue, as for example, bis-(2-ethylhexyl)-phosphate.

Suitable organic acids of sulfur are, for example, $C_4$–$C_{18}$-alkanesulfonic acids, sulfuric acid monoalkylester with 4 to 18 carbon atoms in the alkyl residue, or eventually $C_4$–$C_{18}$-alkyl-substituted arylsulfonic acids with 6 to 10 carbon atoms in the aromatic residue.

Aside from these acidic additives important to the invention, the component A4) contains generally other, known additives. For example, catalysts for the urethane and urea reactions such as tertiary amines or the known tin(II) or tin(IV)-salts of higher carboxylic acids; stabilizers, as for example, the known polyetherpolysiloxanes or internal mold release agents, especially zinc stearate, may also be used.

The polyisocyanate component B) has an isocyanate group content between 8 and 20, preferably between 10 and 18 weight %, and consists essentially of isocyanate-terminated semi-prepolymers prepared by reacting a polyisocyanate component B1) with polyhydroxyl compounds B2).

Component B1) consists of a polyisocyanate or polyisocyanate mixture of the diphenyl methane series. The phrase "polyisocyanate of the diphenyl methane series" represents the general definition of polyisocyanates, as they develop through phosgenation of aniline/-formaldehyde-condensates, and exist as individual compounds in the phosgenation products, while the phrase "polyisocyanate mixture of the diphenyl methane series" stands for any mixtures of polyisocyanates of the diphenyl methane series, for example, for the phosgenation products mentioned, for the mixtures which occur as distillate or distillation residues following separation by distillation of such mixtures, and for any mixtures of polyisocyanates of the diphenyl methane series. As is known in the art, some polyisocyanate mixtures of the diphenyl methane series are liquid per se. Also, as is known in the art, some polyisocyanates of the diphenyl methane series and some polyisocyanate mixtures of the diphenyl methane series are not liquid and must be modified to become liquid. Such modifications include carbodimidization as well as reaction with relatively low hydroxyl compounds.

Typical examples of suitable polyisocyanates B1) are 4,4'-diisocyanatodiphenylmethane; mixtures of the diisocyanatodiphenylmethane isomers; mixtures of the diisocyanatodiphenylmethane isomers with their higher homologs, as they develop through phosgenation of aniline/formaldehyde condensates; and partial carbodiimidized products of the above noted diisocyanate.

The polyol component B2) has a molecular weight of 1,500 to 12,000, preferably 2,000 to 8,000, and especially 3,000 to 6,000 at an average hydroxyl functionality of 2 to 6, preferably 2 to 4, and most preferably 3. Especially preferred are the polyether polyols or polyester polyols, or mixtures of such polyhydroxyl compounds corresponding to this definition. Considered are, for example, appropriate polyether polyols, which eventually contain organic fillers in dispersed form (these are known in the art as "filled-polyols"). The filled polyols can be prepared by polymerization of acrylonitrile and styrene in polyether polyols (see, e.g., U.S. Pat. Nos. 3,383,351, 3,304,273, 3,523,093, and 3,110,695, and German Patent 1,152,536), or by reacting organic diisocyanates and diamines or hydrazine in polyols (see, e.g., German Patent 1,260,142 and German Offenlegeschriftten 2,423,984, 2,519,004, 2,513,815, 2,550,833, 2,550,862, 2,633,293 or 2,550,796). The polyether polyols or polyester polyols of the above type mentioned under A2) are also suitable as component B2), as far as they have the requisite molecular weight and functionality.

For the manufacture of NCO-semi prepolymers B), the components B1) and B2) are preferably brought to reaction in such quantity ratios (NCO-excess) that NCO semi-prepolymers with the above mentioned NCO-content are obtained. The corresponding reaction occurs in general within the temperature range of 25° to 100° C. At the manufacture of NCO-semi-prepolymers, preferably the total quantity of the polyisocyanate component B 1) with preferably the total quantity of the component B2), are reacted which was provided for the production of the NCO semi-prepolymers.

The process of the invention is carried out using the known reaction injection mold technology ("RIM-process"), as is described in U.S. Pat. Nos. 4,218,543 and 5,262,448. The amounts of the components A) and B) correspond to an isocyanate index of from 90 to 120. The quantity of the reaction mixture brought into the mold is calculated so that the molded part has a density of at least 0.8, preferably 1.0 to 1.4 g/cm$^3$. The density of the resulting molded parts naturally depends strongly on the type and weight percent of the fillers used. In general, the molded parts of the present invention are microcellular elastomers, i.e, not genuine foam materials with a visible foam structure. This means that any added organic blowing agents have less the function of a genuine blowing agent, but rather the function of a flow medium.

The base temperature of the reaction mixture brought into the mold from components A) and B) is generally between 20 and 80, preferably between 30° and 70° C. The temperature in the mold is generally between 30 and 130, preferably between 40° and 80° C. The molding tools used, are of known type, preferably from aluminum or steel or of metal-injected expoxide tools. The inner walls of the mold can also be coated with the known external mold release agents for improvement of the demolding characteristics.

The molded parts developing in the mold can generally be demolded after a mold residence time of 5 to 180 seconds. Typically, a tempering at a temperature of from about 60° to 180° C. for a time period of 30 to 120 minutes follows demolding.

The molded parts obtained are especially suitable for the manufacture of flexible automobile fenders or flexible car body elements, which are most often painted after their manufacture.

The invention is further illustrated but is not intended to be limited by the following examples in which all parts and percentages are by weight unless otherwise specified.

EXAMPLES

In the examples, the following materials were used:
Semi-prepolymer 1
80 weight-parts 4,4'-diisocyanatodiphenyl methane are reacted at 80° C. with 100 weight-parts of a polyether polyol with molecular weight 3,800, produced by propoxylation of trimethylopropane and subsequent ethoxylation of the propoxylation product (PO:EO-weight ratio=87:13) to an NCO-semi-prepolymer with an NCO-content of 13.8 weight %.
Polyol 1 (A2)
Polyetherpolyol of molecular weight 4,800, produced by propoxylation of trimethylol propane and subsequent ethyloxylation of the propoxylation product (PO:EO-weight ratio=85:15).
Aminopolyether 1 (A2) Commercial diaminopolyether of molecular weight 400, produced by amination of an appropriate polypropylene glycol (Jeffamine D 400 from Texaco).
Performance The processing of the recipes described in the following examples is done using the reaction injection molding process. The A-component and the B-component are supplied to high pressure metering equipment and after intense mixing in an impingement mixhead they are introduced into a temperature adjustable hot metal mold in which the inner wall of the mold was coated with a commercial mold release agent (RTWC 2006 from Chem Trend).

The mold made from steel allows the manufacture of test plates of the dimensions 300×300×3 mm. The filling is done from the long side via a choker bar.

The mold temperature was 80° C., and the raw material temperature 45° C.

The mechanical values are measured after tempering at 120° C. for 45 min.

EXAMPLE 1

| A-Component | |
|---|---|
| 62.7 pbw | a mixture from 65 weight-% 1-methyl-3,5-diethyl-2,4-diaminobenzene and 35 weight-% 1-methyl-3,5-diethyl-2,6-diamino ("DETDA") (A1) |
| 21.2 pbw | Polyol 1 (A2) |
| 10.6 pbw | Aminopolyether (A2) |
| 5.3 pbw | zinc stearate (A4) |
| 0.1 pbw | Stabilizer B 8404 from Goldschmidt, Essen (A4) |
| 90.0 pbw | Fiberglass MF 7980 from Bayer AG (average length l = 190 μm, l/d = 14:1) (A3) |
| 3.0 pbw | Ricinoleic acid (A4) |

The A-component has a storage life of more than 24 hours.

| B-Component | |
|---|---|
| 190 pbw | Semi-prepolymer 1 |

Characteristics of the molded part:

| | |
|---|---|
| Shore D (DIN 53 505) | 67 |
| Tearing resistance (MPa) (DIN 53 504) | 36 |
| Breaking elongation (%) (DIN 53 504) | 170 |
| Shrinkage X-axis (%) | 0.55 |

EXAMPLE 2

| A-Component | |
|---|---|
| 62.7 pbw | DETDA (A1) |
| 21.3 pbw | Polyol 1 (A2) |
| 10.6 pbw | Aminopolyether 1 (A2) |
| 5.3 pbw | zinc stearate (A4) |
| 0.1 pbw | Stabilizer B 8404 from Goldschmidt, Essen (A4) |
| 90.0 pbw | Fiberglass MF 7980 from Bayer AG (A3) |
| 3.0 pbw | Oleic acid (A4) |

-continued

The A-component has a storage life of more than 24 hours.

B-Component 190 pbw Semi-prepolymer 1

Characteristics of the molded part:

| | |
|---|---|
| Shore D | 68 |
| Tearing resistance (MPa) | 36 |
| Breaking elongation (%) | 155 |
| Shrinkage X-axis (%) | 0.58 |

EXAMPLE 3

A-Component 62.7 pbw DETDA (A1)
21.3 pbw Polyol 1 (A2)
10.6 pbw Aminopolyether 1 (A3)
5.3 pbw Zinc stearate (A4)
0.1 pbw Stabilizer B 8404 from Goldschmidt, Essen (A4)
90.0 pbw Fiberglass MF 7980 from Bayer AG (A3)
0.5 pbw Polyricinoleic acid from the acid number of 60 (A4)

The A-component has a storage life of several hours.

B-Component 190 g Semi-prepolymer 1

Characteristics of the molded part:

| | |
|---|---|
| Shore D | 68 |
| Tearing resistance (MPa) | 36 |
| Breaking elongation (%) | 165 |
| Shrinkage X-axis (5) | 0.56 |

EXAMPLE 4

A-Component 62.7 pbw DETDA (A1)
21.3 pbw Polyol 1 (A2)
10.6 pbw Aminopolyol 1 (A2)
5.3 pbw Zinc stearate (A4)
0.1 pbw Stabilizer B 8404 from Goldschmidt, Essen (A4)
90.0 pbw Fiberglass MF 7980 from Bayer AG (A3)
5.0 pbw a reaction product having an acid number of 94 and prepared by reacting a polypropylene glycol of the OH-number 112 and maleic acid anhydride (A4)

The A-Component has a storage life of more than 24 hours.

B-Component 190 pbw Semi-prepolymer 1

Characteristics of the molded part:

| | |
|---|---|
| Shore D | 68 |
| Tearing resistance (MPa) | 36 |
| Breaking elongation (%) | 155 |
| Shrinkage X-axis (%) | 0.53 |

EXAMPLE 5

A-Component 62.7 pbw DETDA (A1)
21.3 pbw Polyol 1 (A2)
10.6 pbw Amino polyether 1 (A2)
5.3 pbw Zinc stearate (A4)
0.1 pbw Stabilizer B 8404 from Goldschmidt, Essen (A4)
90.0 pbw Fiberglass MF 7980 from Bayer AG (A3)
2.5 pbw Bis-(2-ethylhexyl)-phosphate (A4)

The A-component has a storage life of more than 24 hours.

-continued

B-Component 190 pbw Semi-prepolymer 1

Characteristics of the molded part:

| | |
|---|---|
| Shore D | 67 |
| Tearing resistance (MPa) | 37 |
| Breaking elongation (%) | 160 |
| Shrinkage X-axis (%) | 0.54 |

EXAMPLE 6

A-Component 62.7 pbw DETDA (A1)
21.3 pbw Polyol 1 (A2)
10.6 pbw Aminopolyether 1 (A2)
5.3 pbw Zinc stearate
0.1 pbw Stabilizer B 8404 from Goldschmidt, Essen (A4)
90.0 pbw Fiberglass MF 7980 from Bayer AG (A3)
3.0 pbw Benzene sulfonic acid (A4)

The A-Component has a storage life of more than 24 hours.

B-Component 190 g Semi-prepolymer 1

Characteristics of the molded part:

| | |
|---|---|
| Shore D: | 67 |
| Tearing resistance (MPa) | 37 |
| Breaking elongation (%) | 165 |
| Shrinkage X-axis (%) | 0.57 |

EXAMPLE 7 (Comparison)

A-Component 62.7 pbw DETDA (A1)
21.3 pbw Polyol 1 (A2)
10.6 pbw Aminopolyether 1 (A2)
5.3 pbw Stearate of zinc
0.1 pbw Stabilizer B 8404 from Goldschmidt, Essen (A4)
90.0 pbw Fiberglass MF 7980 from Bayer AG (A3)

The A-Component has a storage life of only approx. 4 hours

B-Component 190 pbw Semi-prepolymer 1

Characteristics of the molded part:

| | |
|---|---|
| Shore D | 68 |
| Tearing resistance (MPa) | 35 |
| Breaking elongation (%) | 160 |
| Shrinkage X-axis (%) | 0.88 |

Examples 1 to 6 based on the invention show the surprising effect of a reduced shrinkage. This lies within a range which has been unusual so far for polyurethane/urea elastomers produced by the semi-prepolymer process.

The shrinkage of molded parts, which are produced based on the single-step process is between 0.5 and 0.6%. This "natural" shrinkage is already considered during the design of the molds. A molded part produced according to the state of the art (Example 7) based on the semi-prepolymer process nevertheless shows a shrinkage of 0.88%. If this is transferred to the length of an automobile threshold of 100 cm, this means an additional shrinkage of approx. 3 mm which is outside of the specification limits of the automobile manufacturer, who can tolerate an additional shrinkage of 1 mm maximum. The same shrinkage as achieved by the single step process is only reached due to the additives (A4) essential to the invention, so that the prepolymer process can also be used for the manufacture of molded automobile parts with continued use of the same molds as before. In addition, the storage life of the A-component is noticeably increased through the addition of the acidic component A4) essential to the invention.

The influence upon the sedimentation stability is explained in the following table, whereby the components listed are homogenized by stirring for 60 seconds, and are subsequently poured into a beaker with a diameter of 5 cm. The settling behavior is then evaluated. The height of the filler-free phase in mm was determined after storage for the time period indicated in the table. The A-component which was applied in this test consisted of 75 weight-parts DETDA, 25 weight parts polyol 1,100 weight parts fiberglass MF 7980 from Bayer AG, and 5.0 weight parts of the additives A4) according to Examples 3 to 7.

TABLE

| Addition A4 accor. | Settling behavior of the filler mixture after | | |
|---|---|---|---|
| | 6 hrs | 12 hrs | 24 hrs |
| Example 3 | none | none | none |
| Example 4 | none | none | none |
| Example 5 | none | none | none |
| Example 6 | none | none | none |
| Example 7 | none | none | none |
| w/o addition A4 | 3 mmw | 5 mm | 10 mm |

Similar differences in the settling behavior are observed with use of equal parts of Wollastonite as filler A3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the manufacture of flexible molded parts from a polyurethane/urea elastomer through reaction in closed molds of reaction mixtures that are produced by the reaction injection molding process wherein the reaction mixture comprises:
   1) an A-component comprising
      A1) one or more aromatic diamines which have at least one alkyl substituent each in a position ortho to the amino groups,
      A2) one or more aliphatic reactive components having an average hydroxyl or amine functionality of from 2 to 6 with an average molecular weight of 230 to 12,000, and consisting of at least one polyether or polyester containing hydroxyl and/or primary amino groups in a quantity of 5 to 20 equivalent-%, based on the total quantity of the groups reactive with isocyanate present in the components A 1) and A2),
      A3) inorganic fillers in a quantity of 15 to 60 weight %, based on the total weight of the components A1) to A3), and
      A4) other additives with
   2) a B-component, consisting essentially of an isocyanate group-containing semi-prepolymer having an isocyanate group content of from 8 to 20 weight %, and being prepared by reacting:
      B1) a polyisocyanate component, consisting of a polyisocyanate or polyisocyanate mixture of the diphenyl methane series, and
      B2) a polyol component with an average molecular weight of 1,500 to 12,000, and an average hydroxyl functionality of at least 2.0,
   wherein the amounts of the components are such that the isocyanate index of the reaction mixture is from 90 to 120, and wherein component A4) comprises one or more acidic group-containing compounds having an acid number of from 20 to 400 in a quantity of 0.1 to 15.0 weight %, based on the weight of components A 1) and A2.

2. The process of claim 1, wherein the acidic group containing compound is selected from the group consisting of (i) carboxylic acids, (ii) organic acids of phosphorous, and (iii) organic acids of sulfur.

* * * * *